(12) United States Patent
Ting et al.

(10) Patent No.: US 12,625,416 B2
(45) Date of Patent: May 12, 2026

(54) MULTI-CAMERA MODULE

(71) Applicant: PRIMAX ELECTRONICS LTD., Taipei City (TW)

(72) Inventors: Kuan-Pao Ting, Taipei City (TW); Ming-Chih Huang, Taipei City (TW); Guo-Cheng Fang, Taipei City (TW)

(73) Assignee: PRIMAX ELECTRONICS LTD., Taipei City (TW)

( * ) Notice: Subject to any disclaimer, the term of this patent is extended or adjusted under 35 U.S.C. 154(b) by 164 days.

(21) Appl. No.: 18/656,617

(22) Filed: May 7, 2024

(65) Prior Publication Data

US 2025/0321468 A1    Oct. 16, 2025

(30) Foreign Application Priority Data

Apr. 10, 2024    (TW) ................................. 113113226

(51) Int. Cl.
*G03B 17/55*        (2021.01)
*G03B 17/12*        (2021.01)

(52) U.S. Cl.
CPC ............. *G03B 17/55* (2013.01); *G03B 17/12* (2013.01)

(58) Field of Classification Search
CPC ................................. G03B 17/55; G03B 17/12
See application file for complete search history.

(56) References Cited

U.S. PATENT DOCUMENTS

2021/0400179 A1* 12/2021  Brown .................. G03B 17/55
2023/0244128 A1*  8/2023  Van Den Brink ....... H05B 3/84
                                                              359/820

FOREIGN PATENT DOCUMENTS

WO      WO-2023278617 A2 *  1/2023  ......... G02B 27/0018

* cited by examiner

*Primary Examiner* — Minh Q Phan
(74) *Attorney, Agent, or Firm* — WPAT, PC

(57)        ABSTRACT

A multi-camera module includes a housing, camera modules and heating modules. Each of the camera modules includes: a lens holder; a circuit board, disposed on a back surface of the lens holder and having a control element; and a lens module, partially disposed in the lens holder and having a front lens. Each of the heating modules includes: an electrical connector, electrically connected to the control element; a heating element, close to or in contact with the front lens, and electrically connected to the control element through the electrical connector; and a temperature sensor, close to the front lens, and electrically connected to the control element through the electrical connector, in which the temperature sensor is configured to measure a temperature close to the front lens. When the temperature is lower than a set temperature, the control element turns on the heating element.

9 Claims, 6 Drawing Sheets

MULTI-CAMERA MODULE

FIELD OF THE INVENTION

The present disclosure relates to a multi-camera module, and in particular, to a multi-camera module that automatically heats a front lens.

BACKGROUND OF THE INVENTION

Although a current single-camera module is equipped with a heater, the heater must be turned on manually. In addition, it cannot replace a visual range, so the current single-camera module still needs to be improved.

SUMMARY OF THE INVENTION

The present invention provides a multi-camera module, which includes a housing, a plurality of camera modules and a plurality of heating modules. Each of the camera modules includes: a lens holder; a circuit board, disposed on a back surface of the lens holder and having a control element; and a lens module, partially disposed in the lens holder and having a front lens located outside the lens holder. Each of the heating modules includes: an electrical connector, electrically connected to the control element of the circuit board; a heating element, close to or in contact with the front lens of the lens module, and electrically connected to the control element of the circuit board through the electrical connector; and a temperature sensor, close to the front lens, and electrically connected to the control element of the circuit board through the electrical connector, in which the temperature sensor is configured to measure a temperature close to the front lens, and the control element turns on the heating element when the temperature is lower than a set temperature.

In some embodiments of the present disclosure, the housing has a transparent portion facing the heating elements of the heating modules and the front lenses of the lens modules.

In some embodiments of the present disclosure, the housing has an opening exposing the heating elements of the heating modules and the front lenses of the lens modules, and the multi-camera module further includes: a transparent cover, disposed in the opening to cover the heating elements of the heating modules and the front lenses of the lens modules.

In some embodiments of the present disclosure, the transparent portion or the transparent cover is close to or in contact with a surface of the heating element away from the lens module.

In some embodiments of the present disclosure, the transparent portion or the transparent cover is not parallel to the front lenses.

In some embodiments of the present disclosure, each of the front lenses is not parallel to the corresponding heating element.

In some embodiments of the present disclosure, the temperature sensor is disposed on a surface of the heating element close to or in contact with the front lens of the lens module.

In some embodiments of the present disclosure, the heating elements are a heating sheet having a plurality of openings respectively exposing the front lenses.

In some embodiments of the present disclosure, the heating elements are a plurality of ring-shaped heating elements separated from each other and respectively surrounding the front lenses.

In some embodiments of the present disclosure, the housing includes: a rear housing, accommodating the lens holder, the circuit board and a portion of the lens module of each of the camera modules and a portion of the electrical connector of each of the heating modules; and a front housing, accommodating another portion of the lens module of each of the camera modules and another portion of the electrical connector, the heating element and the temperature sensor of each of the heating modules.

BRIEF DESCRIPTION OF THE DRAWINGS

Aspects of the present disclosure are best understood from the following embodiments, read in conjunction with accompanying drawings. However, it should be understood that in accordance with common practice in the industry, various features have not necessarily been drawn to scale. Indeed, shapes of the various features may be suitably adjusted for clarity, and dimensions of the various features may be arbitrarily increased or decreased.

DETAILED DESCRIPTION OF THE PREFERRED EMBODIMENT

Figure 1:
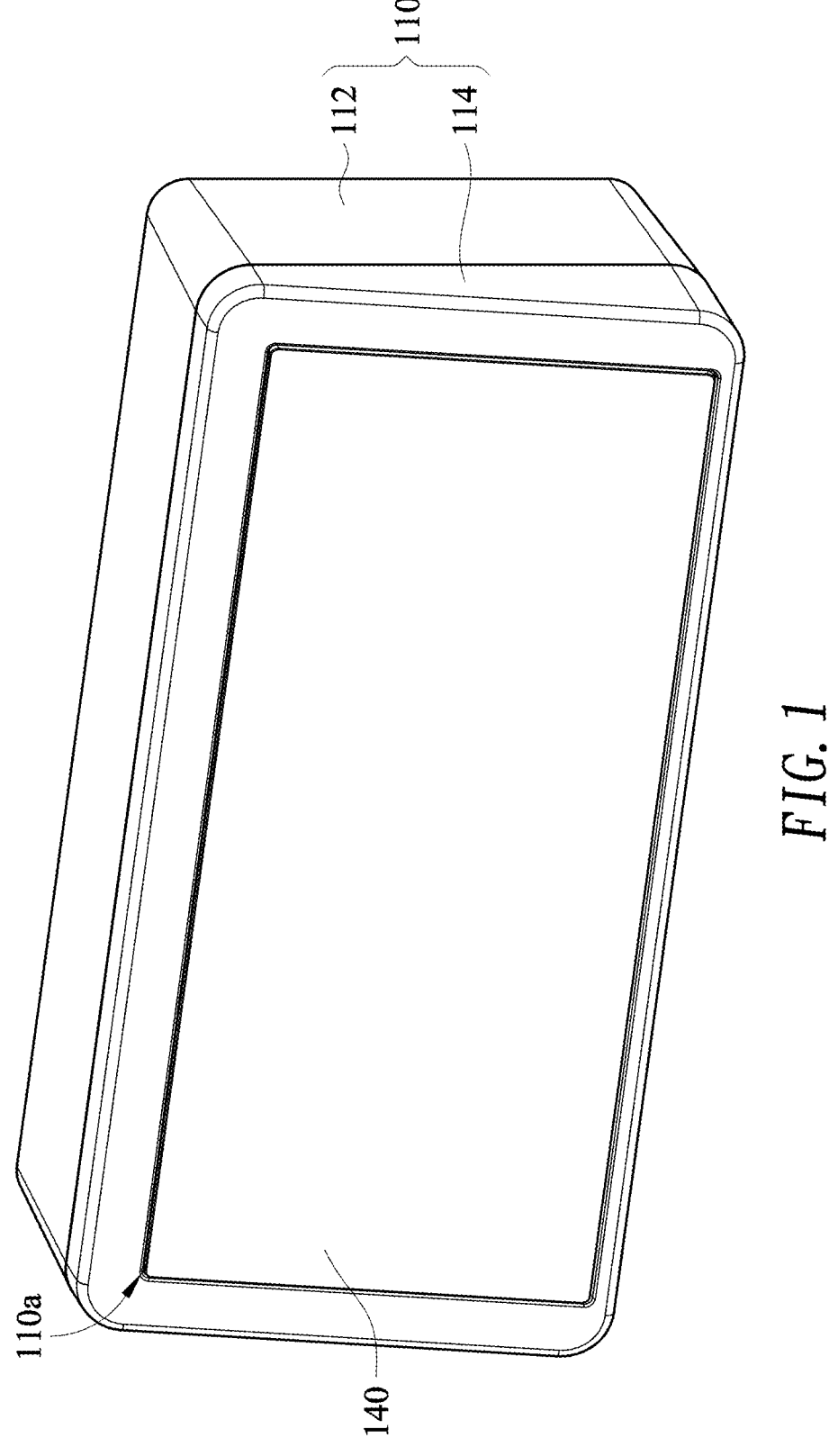
FIG. 1 is a three-dimensional schematic diagram of a multi-camera module according to an embodiment of the present invention.

The advantages and features of the present disclosure and the method for achieving the same will be described in more detail with reference to exemplary embodiments and accompanying drawings to make it easier to understand. However, the present disclosure can be implemented in different forms and should not be construed as being limited to the embodiments set forth herein. On the contrary, for those skilled in the art, the provided embodiments will make this disclosure more thorough, comprehensive and complete to convey the scope of the present disclosure.

The spatially relative terms in the text, such as "beneath" and "over", are used to facilitate the description of the relative relationship between one element or feature and another element or feature in the drawings. The true meaning of the spatially relative terms includes other orientations. For example, when the drawing is flipped up and down by 180°, the relationship between the one element and the other element may change from "beneath" to "over." The spatially relative descriptions used herein should be interpreted the same.

As mentioned in background of the invention, a current single-camera module is equipped with a heater, the heater must be turned on manually. In addition, it cannot replace a visual range, so the current single-camera module still needs to be improved. Accordingly, the present invention provides a multi-camera module, which includes a housing, a plurality of camera modules (each including a lens holder, a circuit board and a lens module) and a plurality of heating modules (each including an electrical connector, a heating element and a temperature sensor), which can sense a temperature close to a front lens of each of the lens modules, and has automatic heating function and good waterproof performance, so it can be suitable for an advanced driver assistance system (ADAS), for example, applicable to Level 5 vehicles of Society of Automotive Engineers (SAE).

Specifically, the temperature sensor of each of the heating modules can sense the temperature near the front lens of the corresponding lens module; the temperature sensor is electrically connected to a control element of the circuit board, so when the sensed temperature is lower than a set temperature, the control element of the circuit board can turn on the heating element to perform automatic heating function without having to turn it on manually; the lens modules and the heating modules are all disposed in the housing, and no part of them is exposed outside the housing, and thus the multi-camera module has good waterproof performance. Various embodiments of the multi-camera module of the present invention will be described in detail below.

Figure 2:
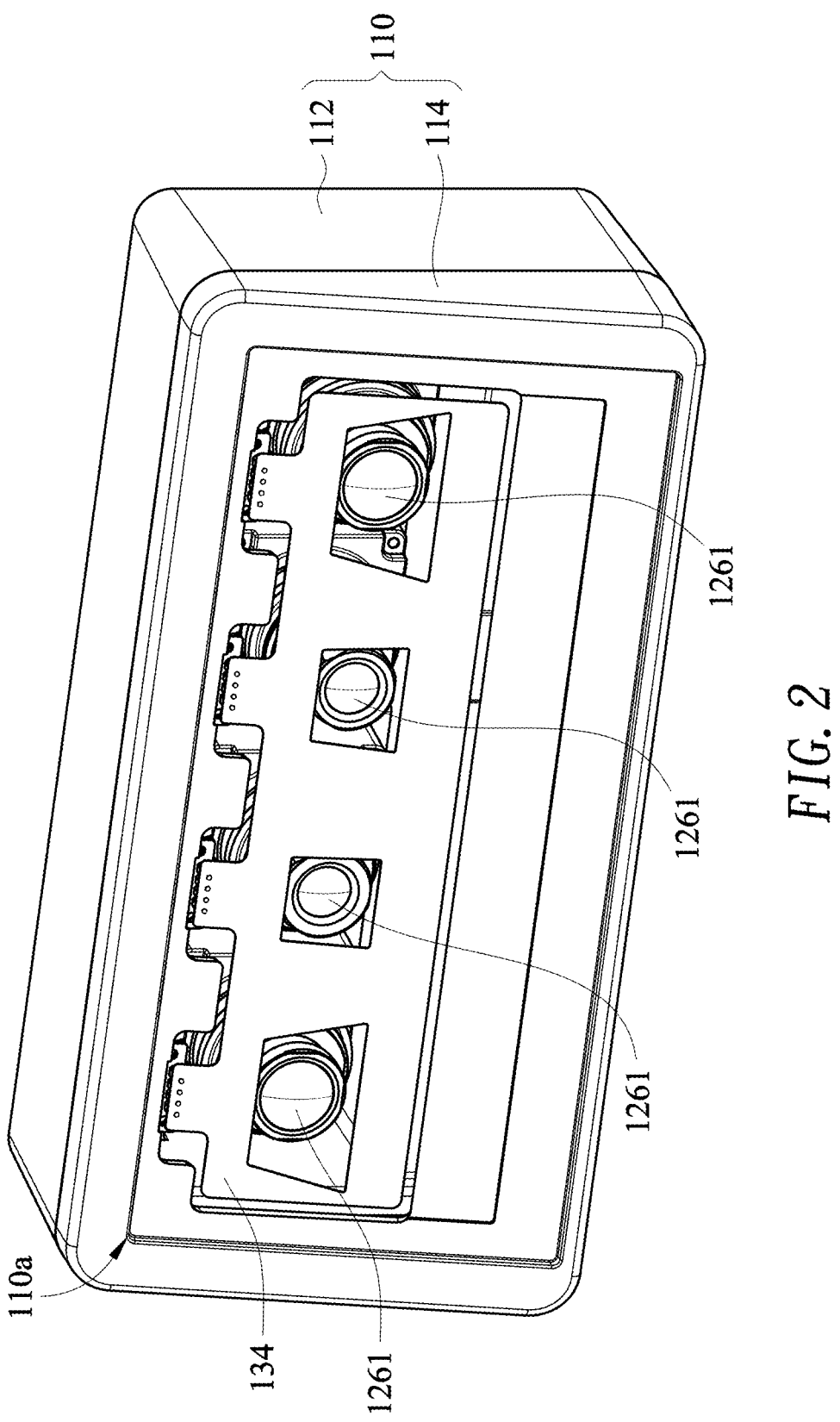
FIG. 2 is a three-dimensional schematic diagram of a multi-camera module (a transparent cover is not shown) according to an embodiment of the present invention.
Figure 3:
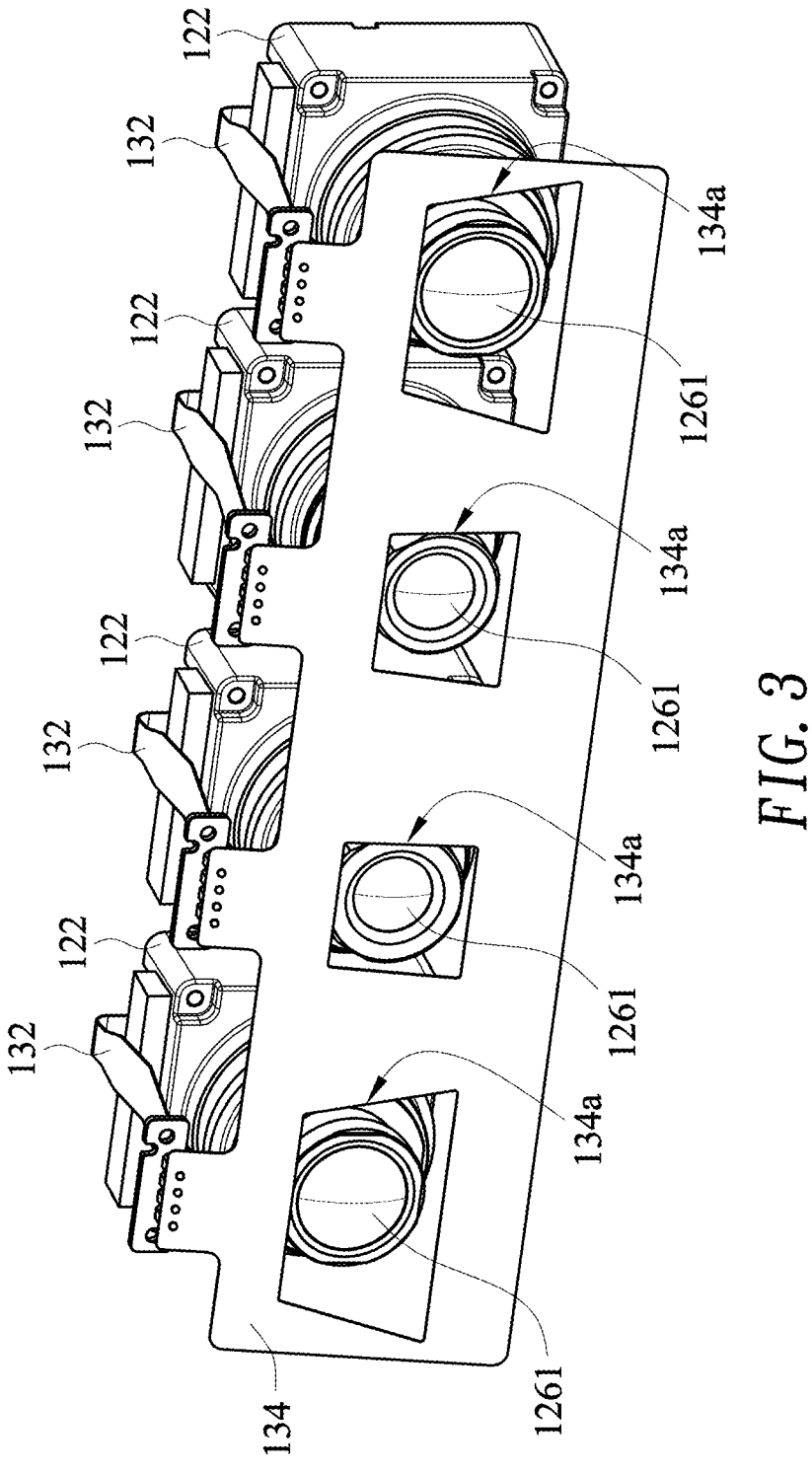
FIG. 3 is a three-dimensional schematic diagram of a camera module and a heating module according to an embodiment of the present invention.
Figure 4:
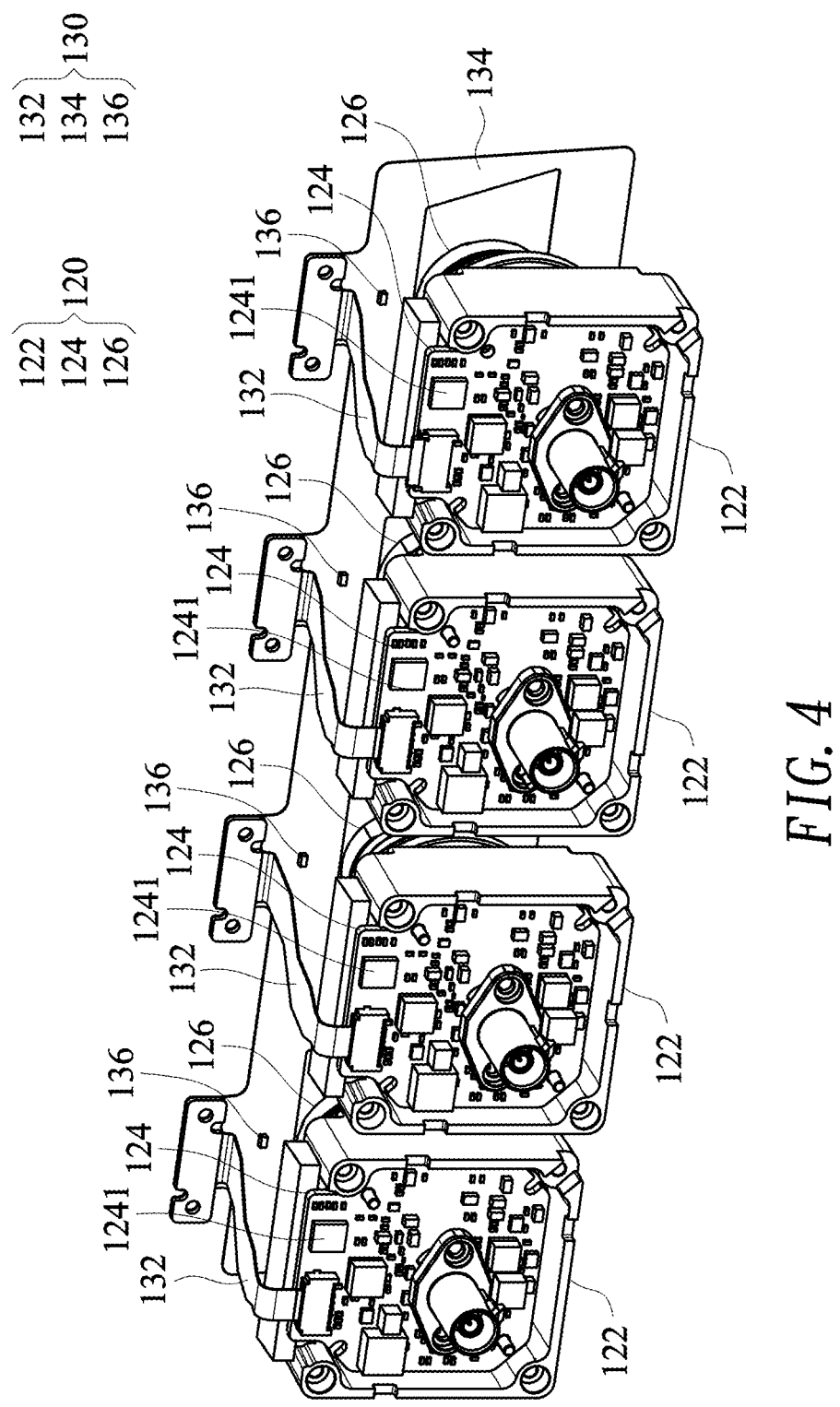
FIG. 4 is a three-dimensional schematic diagram of a camera module and a heating module according to an embodiment of the present invention.
Figure 5:
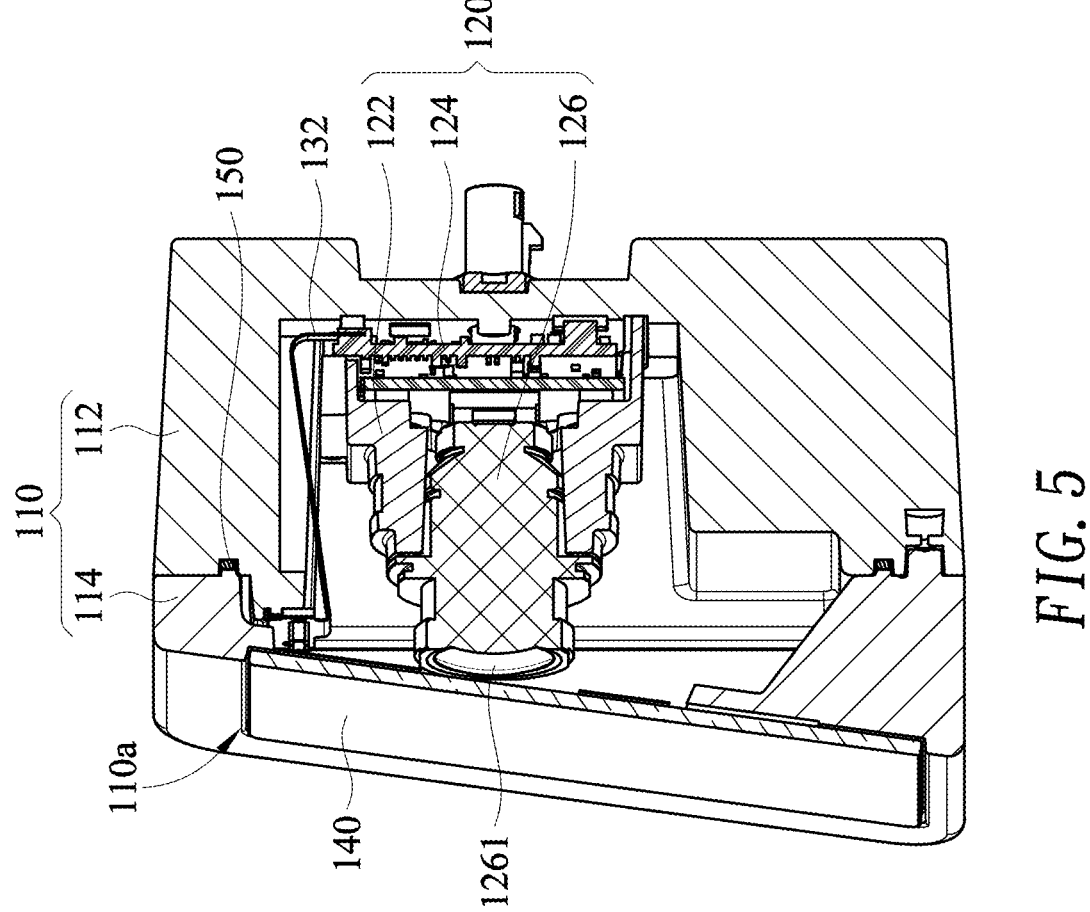
FIG. 5 is a schematic cross-sectional view of a multi-camera module according to an embodiment of the present invention.
Figure 6:
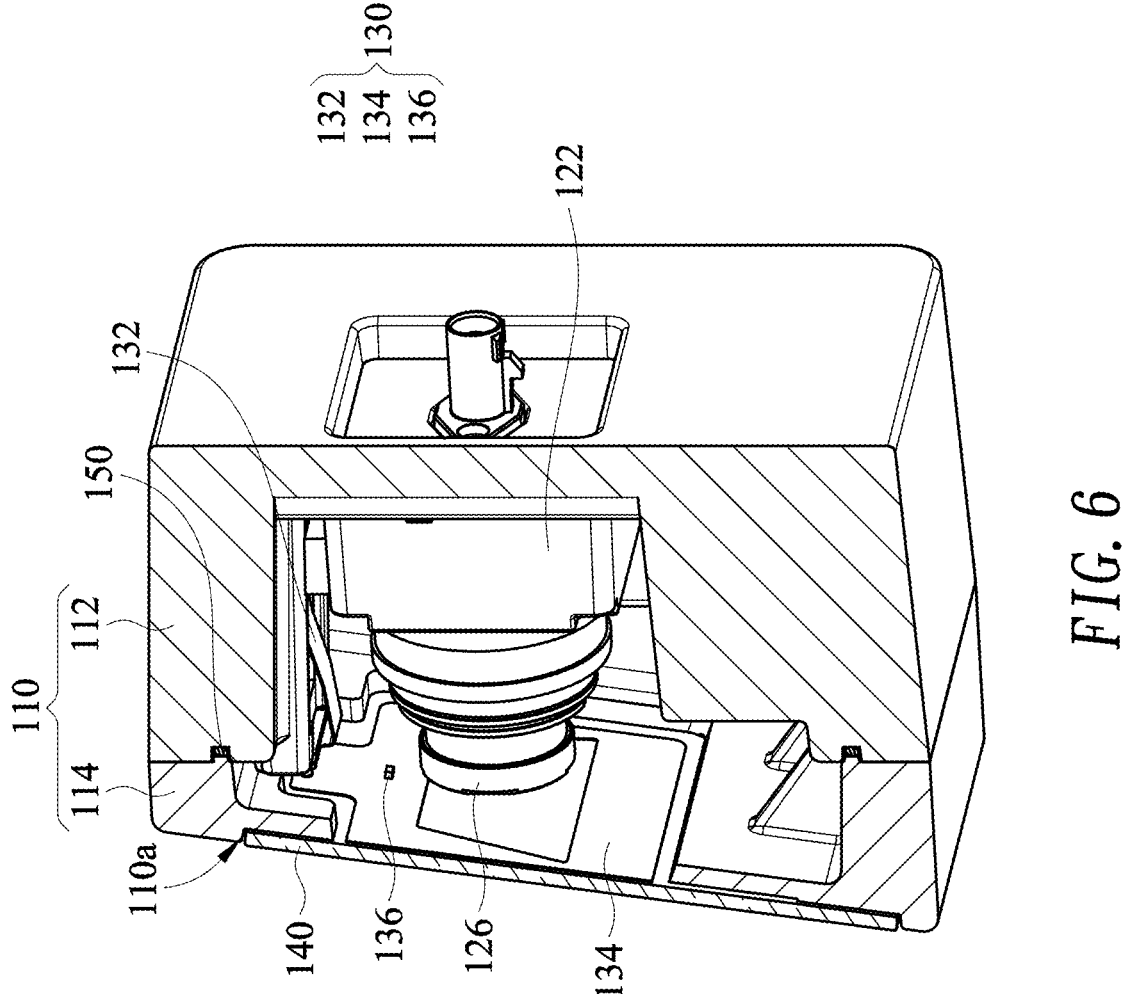
FIG. 6 is a schematic cross-sectional view of a multi-camera module according to an embodiment of the present invention.

FIG. 1 is a three-dimensional schematic diagram of a multi-camera module according to an embodiment of the present invention. FIG. 2 is a three-dimensional schematic diagram of a multi-camera module (a transparent cover is not shown) according to an embodiment of the present invention. FIG. 3 is a three-dimensional schematic diagram of a camera module and a heating module according to an embodiment of the present invention. FIG. 4 is a three-dimensional schematic diagram of a camera module and a heating module according to an embodiment of the present invention. FIG. 5 is a schematic cross-sectional view of a multi-camera module according to an embodiment of the present invention. FIG. 6 is a schematic cross-sectional view of a multi-camera module according to an embodiment of the present invention. As shown in FIGS. 1 to 6, the multi-camera module includes a housing 110, a plurality of camera modules 120 and a plurality of heating modules 130. The heating modules 130 correspond to the camera modules 120, respectively. Each of the camera modules 120 includes a lens holder 122, a circuit board 124 and a lens module 126. Each of the heating modules 130 includes an electrical connector 132, a heating element 134 and a temperature sensor 136.

As shown in FIGS. 1, 2, 5 and 6, the camera modules 120 and the heating modules 130 are all disposed in the housing 110. In some embodiments, the housing 110 has a transparent portion facing the heating elements 134 of the heating modules 130 and the front lenses 1261 of the lens modules 126. In some embodiments, the housing 110 has an opening 110a exposing the heating elements 134 of the heating modules 130 and the front lenses 1261 of the lens modules 126, and the multi-camera module further includes a transparent cover 140 disposed in the opening 110a to cover the heating elements 134 of the heating modules 130 and the front lenses 1261 of the lens modules 126. In some embodiments, the transparent portion or the transparent cover 140 is close to or in contact with a surface of the heating element 134 away from the lens module 126. In some embodiments, the transparent portion or the transparent cover 140 and the heating element 134 are parallel to each other. In some embodiments, the heating element 134 is in contact with or is even entirely attached to an inner surface of the transparent portion or the transparent cover 140.

In some embodiments, as shown in FIGS. 1, 2, 5 and 6, the housing 110 includes a rear housing 112 and a front housing 114. The rear housing 112 accommodates the lens holder 122, the circuit board 124 and a portion of the lens module 126 of each of the camera modules 120 and a portion of the electrical connector 132 of each of the heating modules 130. The front housing 114 accommodates another portion of the lens module 126 of each of the camera modules 120 and another portion of the electrical connector 132, the heating element 134 and the temperature sensor 136 of each of the heating modules 130.

The camera modules 120 may be camera modules with different visual ranges, such as camera modules with visual ranges of 30°, 60°, 100° and 120°, respectively, so that the multi-camera module of the present invention has a plurality of visual ranges. Various embodiments of the lens holder 122, the circuit board 124 and the lens module 126 of the camera module 120 will be described in detail below.

As shown in FIG. 5, the lens holder 122 is configured to accommodate and support a portion of the lens module 126.

As shown in FIGS. 4 and 5, the circuit board 124 is disposed on a back surface of the lens holder 122 and has a control element 1241. In some embodiments, the control element 1241 is a microcontroller unit (MCU). In some embodiments, the control component 1241 is disposed on a surface of the circuit board 124 away from the lens module 126.

In some embodiments, as shown in FIG. 5, each of the camera modules 120 further includes another circuit board (not labeled) disposed between the lens module 126 and the circuit board 124. In some embodiments, the other circuit board further includes an image sensor (not labeled, such as a CMOS image sensor) disposed on a surface of the other circuit board close to the lens module 126.

As shown in FIG. 5, the lens module 126 is partially disposed in the lens holder 122. In some embodiments, the lens module 126 has a plurality of lenses (not shown). The lens module 126 has a front lens 1261 located outside the lens holder 122. In some embodiments, the transparent portion or the transparent cover 140 is not parallel to the front lenses 1261 to eliminate ghost images. In some embodiments, an included angle between the transparent portion or the transparent cover 140 and the front lenses 1261 (i.e., an inclination angle of the transparent portion or the transparent cover 140) is within a range to effectively eliminate stray light. In some embodiments, the included angle ranges between 5 degrees and 15 degrees. In some embodiments, the transparent portion or the transparent cover 140 has a silk screen pattern (e.g., a black silk screen pattern) to block an area outside the visual ranges of the lens modules 126 of the camera modules 120 to help eliminate stray light.

Various embodiments of the electrical connector 132, the heating element 134 and the temperature sensor 136 of the heating module 130 will be described in detail below.

As shown in FIG. 4, the electrical connector 132 is electrically connected to the control element 1241 of the circuit board 124. In some embodiments, the circuit board 124 has a socket (not labeled), and one end of the electrical connector 132 is inserted into the socket, and the socket is electrically connected to the control component 1241. In some embodiments, the socket is disposed on the surface of the circuit board 124 away from the lens module 126. In some embodiments, the electrical connector 132 is a flexible circuit board (FPC). However, the present invention is not limited to the foregoing embodiments. In other embodiments, the electrical connector 132 may be a flat cable or another suitable electrical connector.

As shown in FIGS. 3 to 6, the heating element 134 is close to or in contact with the front lens 1261 of the lens module 126, and is electrically connected to the control element 1241 of the circuit board 124 through the electrical connector 132. In some embodiments, the heating element 134 is connected to the electrical connector 132 through a pogo pin; however, the present invention is not limited to the foregoing embodiments. In other embodiments, the heating element may be integrally formed with the electrical connector, or the heating element may be connected to the electrical connector through another connection element, such as a wire-to-board connector or a board-to-board connector. In some embodiments, the heating element 134 is an electric heating circuit. In some embodiments, as shown in FIGS. 2 to 4, the heating elements 134 are a heating sheet having a plurality of openings 134a respectively exposing the front lenses 1261. In some embodiments, the heating elements 134 are a plurality of ring-shaped heating elements (not shown) that are separated from each other and respectively surround the front lenses 1261. In some embodiments, each of the front lenses 1261 is not parallel to the corresponding heating element 134.

As shown in FIGS. 4 to 6, the temperature sensor 136 is close to the front lens 1261 of the lens module 126, and is electrically connected to the control element 1241 of the circuit board 124 through the electrical connector 132. In some embodiments, the temperature sensor 136 is disposed on a surface of the heating element 134 close to or in contact with the front lens 1261 of the lens module 126, and is electrically connected to the control element 1241 of the circuit board 124 through the heating element 134 and the electrical connector 132. The temperature sensor 126 is configured to measure a temperature near the front lens 1261. In some embodiments, the temperature sensor 126 is also configured to measure a temperature near the transparent portion or the transparent cover 140. In some embodiments, the temperature sensor 156 is a thermistor, such as a negative temperature coefficient (NTC) thermistor.

When the temperature sensed by the temperature sensor 136 is lower than a set temperature (also called a first set temperature, such as 0° C., −5° C., −10° C., −15° C., −20° C. or lower), the control element 1241 automatically turns on the heating element 134 to achieve a defrosting/defogging effect. In some embodiments, when the control element 1241 has turned on the heating element 134, and the temperature sensed by the temperature sensor 136 is equal to or greater than the set temperature (also called as a second set temperature, such as 20° C., 25° C., 30° C., 35° C., 40° C., 45° C., 50° C., 55° C., 60° C. or higher), the control element 1241 automatically turns off the heating element 134.

In some embodiments, as shown in FIGS. 5 and 6, the multi-camera module further includes a seal 150 disposed between the rear housing 112 and the front housing 114 to prevent moisture from penetrating into the multi-camera module. The seal 150 may be, for example, an O-ring or another suitable seal.

However, the above are only the preferred embodiments of the present disclosure, and should not be used to limit the scope of implementation of the present disclosure, that is, simple equivalent changes and modifications made in accordance with claims and description of the present disclosure are still within the scope of the present disclosure. In addition, any embodiment of the present disclosure or claim does not need to achieve all the objectives or advantages disclosed in the present disclosure. In addition, the abstract and the title are not intended to limit the scope of claims of the present disclosure.

What is claimed is:

1. A multi-camera module, comprising:
a housing;
a plurality of camera modules, disposed in the housing, wherein each of the camera modules comprises:
a lens holder;
a circuit board, disposed on a back surface of the lens holder and having a control element; and
a lens module, partially disposed in the lens holder and having a front lens located outside the lens holder; and
a plurality of heating modules, disposed in the housing and respectively corresponding to the camera modules, wherein each of the heating modules comprises:
an electrical connector, electrically connected to the control element of the circuit board;
a heating element, close to or in contact with the front lens of the lens module, and electrically connected to the control element of the circuit board through the electrical connector; and
a temperature sensor, close to the front lens of the lens module, and electrically connected to the control element of the circuit board through the electrical connector, wherein the temperature sensor is configured to measure a temperature close to the front lens, and the control element turns on the heating element when the temperature is lower than a set temperature, wherein the housing is provided with a transparent portion of a transparent cover covering the heating elements of the heating modules and the front lenses of the lens modules, wherein the transparent portion or the transparent cover is inclined relative to a plane perpendicular to an optical axis of each of the camera modules, and a spacing between the transparent portion or the transparent cover and a lower end of an front end surface of each of the front lenses is greater than a spacing between the transparent portion or the transparent cover and an upper end of the front end surface of each of the front lenses.

2. The multi-camera module of claim 1, wherein the housing has an opening exposing the heating elements of the heating modules and the front lenses of the lens modules, and
the transparent cover is disposed in the opening.

3. The multi-camera module of claim 2, wherein the transparent cover is close to or in contact with a surface of the heating element away from the lens module.

4. The multi-camera module of claim 1, wherein the heating elements are inclined relative to the plane perpendicular to the optical axis of each of the camera modules.

5. The multi-camera module of claim 1, wherein the temperature sensor is disposed on a surface of the heating element close to or in contact with the front lens of the lens module.

6. The multi-camera module of claim 1, wherein the heating elements are a heating sheet having a plurality of openings respectively exposing the front lenses.

7. The multi-camera module of claim 1, wherein the heating elements are a plurality of ring-shaped heating elements separated from each other and respectively surrounding the front lenses.

8. The multi-camera module of claim 1, wherein the housing comprises:

a rear housing, accommodating the lens holder, the circuit board and a portion of the lens module of each of the camera modules and a portion of the electrical connector of each of the heating modules; and a front housing, accommodating another portion of the lens module of each of the camera modules and another portion of the electrical connector, the heating element and the temperature sensor of each of the heating modules, and provided with the transparent portion or the transparent cover.

9. The multi-camera module of claim 1, wherein an included angle between the transparent portion or the transparent cover and the plane perpendicular to the optical axis of each of the camera modules ranges between 5 degrees and 15 degrees.

* * * * *